Oct. 10, 1950     W. S. NEIGHBOUR     2,525,712
SUPPORTING GUIDE FOR MACHINE TOOL ELEMENTS
Filed June 26, 1946     2 Sheets-Sheet 1
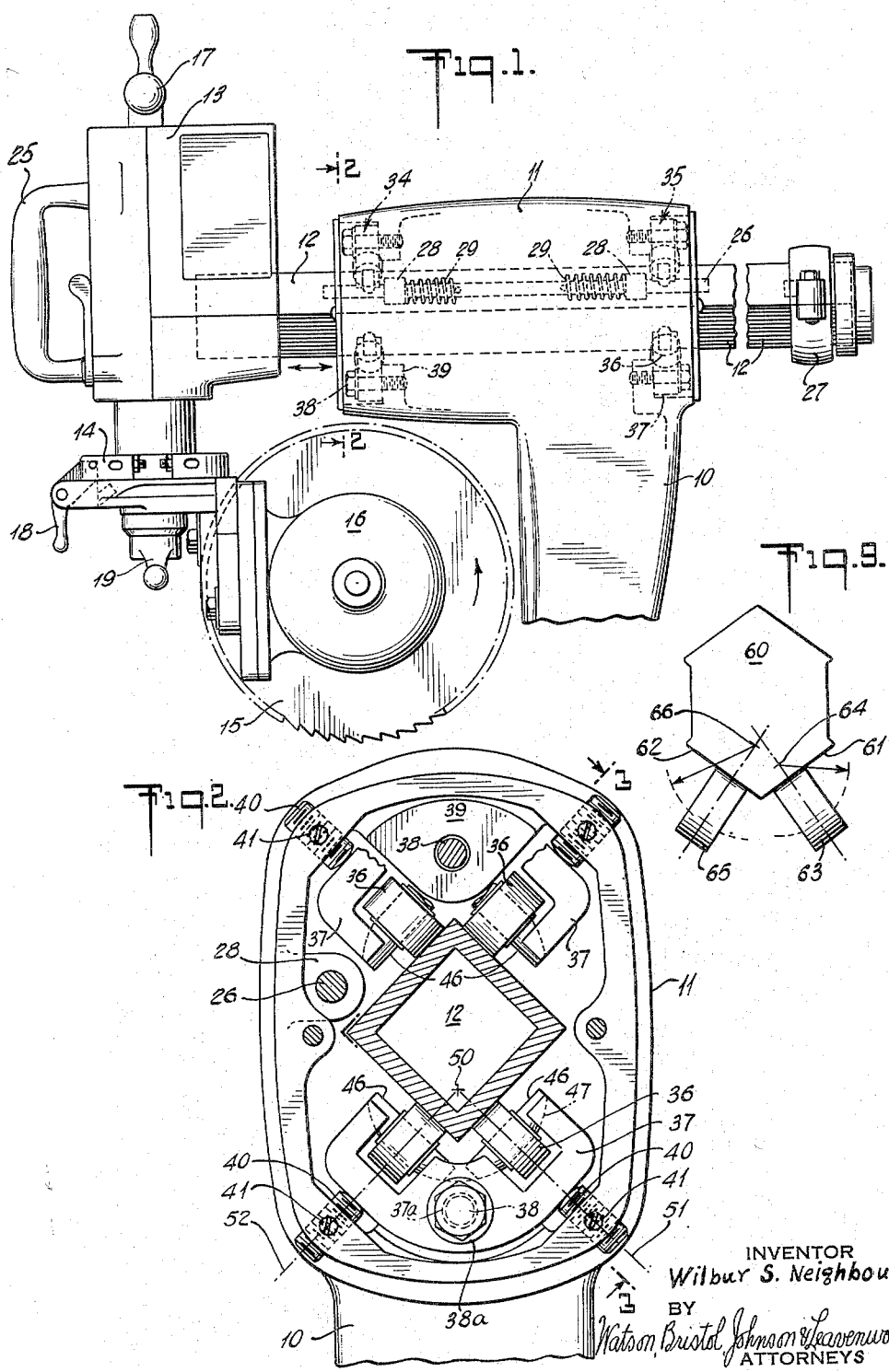

Oct. 10, 1950     W. S. NEIGHBOUR     2,525,712
SUPPORTING GUIDE FOR MACHINE TOOL ELEMENTS
Filed June 26, 1946     2 Sheets-Sheet 2
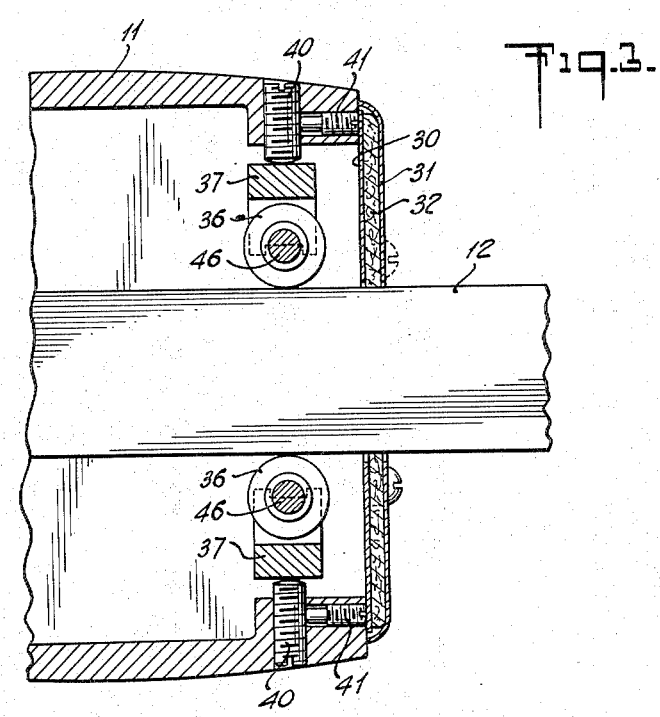
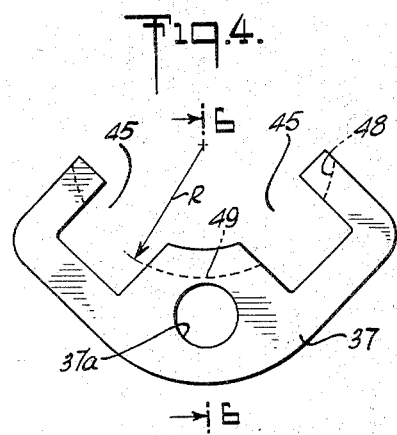
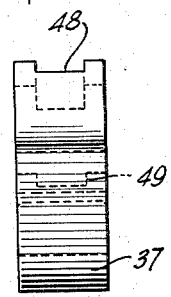
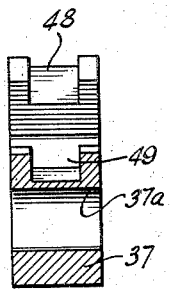
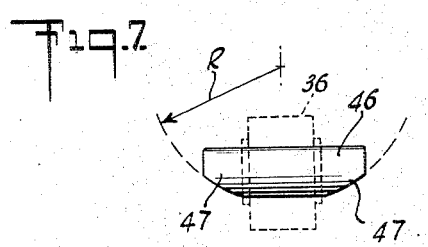
INVENTOR
Wilbur S. Neighbour
BY
Watson, Bristol, Johnson & Leavenworth
ATTORNEYS Patented Oct. 10, 1950

2,525,712

UNITED STATES PATENT OFFICE 2,525,712

SUPPORTING GUIDE FOR MACHINE TOOL ELEMENTS

Wilbur S. Neighbour, Hackettstown, N. J., assignor to American Saw Mill Machinery Company, Hackettstown, N. J., a corporation of New Jersey Application June 26, 1946, Serial No. 679,370

8 Claims. (Cl. 308—6)

1

The invention relates to a combined support and guide for a machine tool carriage element adapted to be translated longitudinally back and forth in its supports. Such an element is commonly referred to as a ram particularly as employed in a radial saw machine comprising the specific type of machine disclosed herein. In such a machine, the ram constitutes a bar or beam-like member of considerable length relative to its cross-section, having supported upon its outer end a rotary saw and associated driving mechanism.

A ram of this character must be capable of being shifted easily by hand, but at the same time be free of any substantial play in its bearings under the stress of working forces and the weight of overhanging parts supported by the cantilever construction. This necessitates that the guides be close fitting and strong, but freely and smoothly operating without binding. The present invention is directed to the accomplishment of such purposes in a simple and effective manner.

The ram is supported entirely on rolls which are symmetrically placed and which are adjustable to provide proper alignment and uniform contact with the track surfaces of the ram. Of particular importance are the arrangement and relation of the parts, whereby the supporting rolls are rendered automatically self-adjusting into a uniform full line contact with the track surface.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 is a view in elevation of the upper portion of a radial saw machine embodying the invention;

Fig. 2 is an elevation taken on the line 2—2 of Fig. 1 comprising accordingly an end view of the upper head with the cover plates to the head removed;

Fig. 3 is a cross section taken on approximately the line 3—3 of Fig. 2;

Fig. 4 is a view in elevation of one of the roll supporting brackets;

Fig. 5 is an end view of the bracket;

2

Fig. 6 is a cross-sectional view taken on the line 6—6 of Fig. 4;

Fig. 7 is a detail view of the roll supporting pin;

Fig. 8 is an end view thereof; and

Fig. 9 is a diagrammatic view indicating a modified arrangement of the ram and supporting rolls.

The invention is capable of application to other types of machine tools and corresponding translatable carriage elements, but is particularly advantageous in a radial power saw as disclosed in the drawings. The general features of the machine include a column 10 supported on a suitable base (not shown) and provided with an upper head 11 in which is slidably mounted a ram 12 carrying at its outer end a head 13 which, in turn, has suspended therefrom a head 14 embodying a rotary saw 15 connected to be driven by the electric motor 16 through any suitable connection as, for example, by mounting the saw directly on the motor shaft. The saw head 14 may be vertically adjustable in the head 13 by a suitable means operable from the hand crank 17 and may also be angularly positioned about a vertical axis through the medium of the latch member 18 and clamp lever 19. The details of these adjusting means and those of various other features which it may be desired to incorporate are omitted since they form no part of the present invention. It will be undestood also that, in accordance with machines of this type, the base portion of the machine will include a work supporting table, and the table and the machine as a whole will contain suitable adjusting means to provide different angles and directions of saw cuts, all as well known in this type of machine.

The ram 12 is adapted to be manually moved forwardly or in the return direction by means of a handle 25, the extreme ends of the strokes being determined by the spring bumper rod 26, the left end of the rod projecting forwardly of the head 11 into position to be engaged by the head 13 and the opposite end extending rearwardly to be engaged by a suitable collar 27 secured on the rear end of the ram. The bumper rod is slidable in collars 28 fixed in the head 11, with the rod 26 normally suspended in its intermediate position by springs 29. Each end of the head 11 has a closure means surrounding the ram 12 (shown more clearly in Fig. 3) comprising an inner plate 30 and an outer plate 31 having inserted therebetween a sheet 32 of felt or other suitable material. The ram 12 as specifically shown in Figs. 1 to 3 is square in cross-section and preferably hollow in the interests of reducing the weight. The ram is guided in the head 11 by two sets of roller supporting means horizontally spaced as indicated generally at 34 and 35 in Fig. 1. The rolls of each set are symmetrically arranged as shown particularly in Fig. 2, comprising two pairs of rolls 36, each pair being mounted on a supporting bracket 37, the details of the bracket being shown particularly in Figs. 4 to 6. The several brackets, of which there are four, may all be identical, and likewise the rolls and supporting means therefor may be identical, and a description of one bracket and its component parts and the manner of mounting the bracket and its rolls will suffice for an understanding of the arrangement of all of them.

Referring for example, to the lower bracket 37 in Fig. 2, a clamping screw bolt 38 extends through an opening 37a in the bracket and is threaded into a lug 39 in the head 11. The opening 37a is sufficiently larger than the diameter of the bolt 38 to provide substantial clearance and the bracket may be adjusted angularly or bodily with respect to bolt 38 by means of the set screws 40, of which there are two for each bracket as shown particularly in Fig. 2. After the appropriate adjustment has been effected, the bolt 38 is tightened to clamp the bracket, a washer 38a preferably being provided under the head of the bolt. Also the set screws 40 may be locked by means of set screws 41. The bracket 37 is provided with two U-shaped openings 45 adapted to receive the rolls 36, the openings 45 being of sufficient width to permit a substantial amount of axial adjustment of the rolls in the plane of the bracket.

The rolls are preferably of a suitable anti-friction type and each is provided with an inner race having an axial opening, in which is secured the supporting pin 46 having projecting trunnion portions 47 at each side of the roll for supporting the roll in the bracket 37. As shown particularly in Figs. 4 to 6, the outer fingers of the bracket 37 are provided with slots 48 adapted to receive the corresponding trunnion portions 47 of the respective rolls, and likewise the middle portion of the bracket is provided with a corresponding slot 49 adapted to receive the opposed trunnion portions of the two rolls.

The bottom surfaces of the slots 48 and 49 and likewise the complemental surfaces of the trunnions 47 are formed on an arc having a radius R as shown in Figs. 4 and 7 and which will now be described more fully in connection with the assembly of Fig. 2. As indicated in this figure, the two pairs of roller assemblies, including the opposed brackets 37, are symmetrically arranged above and below the ram 12, and likewise the two rolls of a single one of the assemblies are symmetrically arranged in their bracket 37 and with respect to the ram 12. With the bracket properly adjusted angularly, the radii R for the bottom of the slots 48 and 49 and the supporting trunnions 47 of the pins 46 have a common center located at 50 as shown for the lower pair of rolls in Fig. 2. This center 50 lies at the intersection of planes 51 and 52 passed perpendicular to the axes of the respective rolls and bisecting the peripheral surface of the rolls. It will be apparent that the intersection 50 of the two planes comprises a line extending parallel to the axis of the ram 12 and its direction of reciprocation. It will also be understood that the axes of the two rolls lie in a common plane perpendicular to the direction of reciprocation and the track surfaces on ram 12. By the arrangement described, the pressure exerted on the periphery of the respective rolls serves automatically to shift them axially in their supports and cause them to assume and maintain a full line contact with the tracking surface of the ram 12. It will be apparent, therefore, that the ram is uniformly and symmetrically supported and guided by rolls which automatically provide a line contact of uniform pressure.

In the specific illustration thus far described, the ram 12 is shown with four flat surfaces in the form of a square. It will be understood, however, that the shape may be materially varied without departing from the principles of the present invention, as, for example, the top and bottom angles need not comprise right angles, and the intervening shape of the ram between the top and bottom edges may be varied considerably from that shown, providing the tracking surfaces of a pair are symmetrically arranged. One such possible variation is indicated, for example, in Fig. 9. As shown in Figs. 2 and 4 to 7, the radii for the supporting surfaces for the two rolls of a pair are equal and are described from a common center 50 in the interests of uniformity and ease of manufacture. The advantages of the automatic axial adjustment of the rolls into full line contact may be obtained, however, in an arrangement of supporting means for the two rolls having different radii, as indicated diagrammatically in Fig. 9. In this figure the ram 60 is provided with lower tracking surfaces 61 and 62, the included angle being an obtuse angle. The radius for the supporting means for the roll 63 is shown as described from a center 64, and the radius for the roll 65 is described from a center 66. It is to be noted, however, that, similarly to Fig. 2, the center 64 lies in a plane which is perpendicular to the axis of and bisects the peripheral surface of the roll 63 and also is intersected by a line passing through the axis of the roll 63 and its line of contact with the track surface 62. The same relation exists as to the roll 65 except that, as shown, it has a somewhat larger radius for its supporting means than the roll 63. Each roll, however, is automatically adjustable about an axis the projection of which is shown at 64 or 66.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a machine embodying a reciprocable carriage, a supporting means having a pair of rolls, a track element having flat bearing surfaces extending longitudinally thereof arranged in the form of a V with the rolls adapted to contact respectively said surfaces, said supporting means and element being relatively translatable in the longitudinal direction of said surfaces, and a supporting bracket for said rolls pivoted intermediate its ends on an axis parallel to said longitudinal bearing surfaces and angularly adjustable about said pivot in a plane perpendicular to said surfaces, said rolls being mounted in spaced relation on the respective outer ends of said bracket with their axes arranged in the form of a V in the general plane of the bracket, each of said rolls having a slidable bearing support in said bracket described on a radius having a center located inwardly in the direction of the corresponding surface adapted to provide axial adjustment for the roll in an arcuate path lying in a plane passing through the axis of the roll and perpendicular to said direction of translation and thereby to provide a line contact between the roll and the corresponding said surface.

2. In a machine tool embodying a reciprocable element having a pair of flat bearing surfaces arranged at an angle to each other in a plane transverse to the direction of reciprocation, a supporting guide roll arranged to engage each of said bearing surfaces and to provide a rolling contact for the element, and a slidable arcuate support for each roll and means for supporting said slidable arcuate supports, said supports for the two rolls lying in a common arc of uniform radius having a center located inwardly from said supports, whereby the rolls are self-adjusting to provide a line contact with the surface of said element.

3. In a machine tool embodying an elongated carrier element mounted for longitudinal reciprocation having longitudinally extending flat bearing surfaces arranged at an angle to each other in a transverse plane, a pair of rolls angularly arranged with respect to each other with one of the rolls contacting each of said surfaces to provide a rolling support for said element, each roll having a supporting trunnion projecting axially therefrom at each side and supporting bearings therefor, the faces of said trunnions opposite to said element being arc-shaped, and said bearings having similar complemental arc-shaped surfaces in which said trunnions are slidable, said trunnion faces of the two rolls and the supporting surfaces therefor being on a common arc of uniform radius described from a common center located inwardly in the direction of said element, the parts being arranged to render the rolls self-adjusting in their supporting bearings to assume a line contact with the corresponding surface of said element.

4. A combined guide and support for a reciprocable carriage element comprising a supporting bracket provided with means for adjusting the position thereof, a pair of rolls mounted in said bracket having their axes at an angle in the form of a V in the general plane of the bracket, each of said rolls being provided with an arcuate support in said bracket enabling independent axial adjustment of the rolls in a corresponding arcuate path in said plane.

5. In a machine embodying a reciprocable carriage, a supporting means having a pair of rolls, a track element having a pair of bearing surfaces extending longitudinally thereof arranged in the form of a V with the rolls adapted to contact respectively said surfaces, said supporting means and element being relatively translatable, said supporting means including a common bracket for said rolls, means for supporting said rolls therein each axially adjustable independently of the other, means for adjusting the position of said bracket both bodily toward and away from said element and angularly about an axis parallel to said direction of translation, and means for clamping said bracket in said adjusted position.

6. In a machine tool, a reciprocable carriage element provided with opposed pairs of flat bearing surfaces extending longitudinally thereof each pair being arranged in the form of a V in a plane perpendicular to the direction of reciprocation, a pair of guide rolls for each said pair of surfaces, and a bearing support for each roll arranged to provide axial self-adjustment of the roll in an arcuate path, the said bearing supports for the guide rolls of each pair comprising bearing surfaces lying in a common arc of uniform radius about a center located inwardly in the direction of said element and lying in planes perpendicular to the axis of and bisecting the respective rolls and enabling thereby each roll automatically to assume a line contact with its said surface.

7. In a machine tool embodying an elongated longitudinally reciprocable carriage element having longitudinally extending flat bearing surfaces arranged in the form of a V, a pair of supporting rolls therefor and a common bracket for supporting said rolls in a corresponding relation with each roll adapted to contact respectively one of said surfaces, each roll being provided with trunnions engaging arcuate supporting surfaces on said bracket the supporting surfaces for the two rolls lying in a common arc of uniform radius about a center located inwardly in the direction of said reciprocable element, means for bodily adjusting the position of said bracket and supporting it in adjusted position comprising spaced screw thread studs engageable with rear surfaces thereof, and means for clamping said bracket in adjusted position.

8. In a machine tool an elongated ram member mounted for longitudinal reciprocation in a horizontal direction provided with opposed pairs of flat bearing surfaces extending longitudinally thereof each pair being arranged in the form of a V in a plane perpendicular to the direction of reciprocation, a pair of guide rolls for each said pair of surfaces, each roll being rotatable on an axis lying in a plane perpendicular to said direction of reciprocation, and a slidable arcuate support for each roll described on a radius having a center located inwardly from said support and means for supporting said slidable arcuate supports located to provide such sliding movement in a plane perpendicular to said direction of reciprocation, the parts being positioned and arranged to enable individual self-adjustment of the rolls in the general direction of their respective axes and thereby to assume a line contact with the corresponding said bearing surface and with said ram closely engaged between said two pairs of rolls.

WILBUR S. NEIGHBOUR.

REFERENCES CITED

The following references are of record in the file of this patent:

UNITED STATES PATENTS

| Number | Name | Date |
|---|---|---|
| 519,514 | Tragethon | May 8, 1894 |
| 1,429,606 | Marsland | Sept. 19, 1922 |
| 1,642,834 | Yeomans | Sept. 20, 1927 |
| 2,399,446 | Morgan | Apr. 30, 1946 |

FOREIGN PATENTS

| Number | Country | Date |
|---|---|---|
| 558,935 | Great Britain | 1944 |